US008887297B2

(12) United States Patent
Reid

(10) Patent No.: US 8,887,297 B2
(45) Date of Patent: Nov. 11, 2014

(54) CREATING AND VALIDATING CRYPTOGRAPHICALLY SECURED DOCUMENTS

(75) Inventor: Colin Wilson Reid, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1244 days.

(21) Appl. No.: 11/777,297

(22) Filed: Jul. 13, 2007

(65) Prior Publication Data
US 2009/0019548 A1    Jan. 15, 2009

(51) Int. Cl.
*G06F 7/04* (2006.01)
*H04L 9/32* (2006.01)

(52) U.S. Cl.
CPC ........... *H04L 9/3247* (2013.01); *H04L 2209/80* (2013.01); *H04L 2209/60* (2013.10)
USPC .............................. 726/27; 713/176; 713/180

(58) Field of Classification Search
None
See application file for complete search history.

(56) References Cited

U.S. PATENT DOCUMENTS

| | | | |
|---|---|---|---|
| 5,974,238 A | 10/1999 | Chase, Jr. | |
| 6,389,423 B1 | 5/2002 | Sakakura | |
| 6,505,200 B1 | 1/2003 | Ims et al. | |
| 6,732,277 B1 | 5/2004 | Vandergeest et al. | |
| 6,757,896 B1 | 6/2004 | Cohen et al. | |
| 6,928,467 B2 | 8/2005 | Peng | |
| 7,134,020 B2 | 11/2006 | Eagle et al. | |
| 7,353,397 B1 * | 4/2008 | Herbach .................. | 713/176 |
| 2003/0005306 A1 | 1/2003 | Hunt et al. | |
| 2003/0037006 A1 | 2/2003 | Maruyama et al. | |
| 2003/0120685 A1 | 6/2003 | Duncombe et al. | |
| 2003/0217264 A1 | 11/2003 | Martin et al. | |
| 2004/0172423 A1 | 9/2004 | Kaasten et al. | |
| 2005/0050363 A1 | 3/2005 | Naka et al. | |
| 2005/0055698 A1 | 3/2005 | Sasaki et al. | |
| 2005/0137895 A1 | 6/2005 | Whitlock et al. | |
| 2005/0138211 A1 | 6/2005 | Cheng | |
| 2007/0038688 A1 | 2/2007 | Morrill et al. | |

FOREIGN PATENT DOCUMENTS

EP          1796310 A1      6/2007
IL     WO02082281 A2     10/2002

(Continued)

OTHER PUBLICATIONS

International Search Report and Written Opinion Received for PCT Application No. PCT/US2008/069842, mailed on Feb. 13, 2009, 10 pages.

(Continued)

*Primary Examiner* — Kaveh Abrishamkar
(74) *Attorney, Agent, or Firm* — Nicholas Chen; Sade Fahokun; Micky Minhas

(57) ABSTRACT

Aspects of the subject matter described herein relate to creating and validating cryptographically secured documents. In aspects, documents are encrypted to protect them from unauthorized access. An entity having namespace ownership rights may create a document in an authorized namespace and sign the document with a private key. Other entities may validate that the document was created by an authorized namespace owner by using a public key available in security data associated with a parent document of the document. For a root document, the public key may be available from a directory service. A namespace owner may change the namespace owner(s) that are allowed to create children of a document.

20 Claims, 8 Drawing Sheets

(56) References Cited

FOREIGN PATENT DOCUMENTS

| JP | 2002-183141 A | 6/2002 |
| JP | 2003-248736 A | 9/2003 |
| JP | 2004-502379 A | 1/2004 |
| JP | 2004-151163 A | 5/2004 |
| JP | 2004-151868 A | 5/2004 |
| JP | 2005-332010 A | 12/2005 |
| JP | 2006-092525 A | 4/2006 |
| JP | 2008-181290 A | 8/2008 |
| JP | 2008-299395 A | 12/2008 |
| KR | 10-2004-0070382 A | 8/2004 |

OTHER PUBLICATIONS

Requena, "An Implementation of the Server Cache Synchronisation Protocol (SCSP)", Mar. 1999, pp. 79.

Scott, et al., "Haggle: a Networking Architecture Designed Around Mobile Users", 2006, pp. 9.

Young, "Expanding Network-Portable Access to Remote Computing Resources", May 2003, David Young, University of Queensland, 2003, pp. 62.

Office Action Received for Japanese Patent Application No. 2010-517086, mailed on Feb. 1, 2013, 3 pages of Japanese Office action and 3 Pages of English translation.

* cited by examiner

FIG. 4

| Document Data Structure 400 | |
|---|---|
| Document Identifier | 405 |
| Security Data Identifier | 410 |
| Timestamp | 415 |
| Encrypted Data | 420 |
| Namespace Signature | 425 |

| Security Data Structure 427 | |
|---|---|
| Security Data Identifier | 430 |
| Authorization(s) | 440 |
| Usage Options | 445 |
| Key(s) | 450 |
| Signature(s) | 455 |

CREATING AND VALIDATING CRYPTOGRAPHICALLY SECURED DOCUMENTS

BACKGROUND

Granting access to user data is typically performed programmatically. That is, an operating system or web service grants access to the data based on access rights of the user. This model is not very secure, particularly when the user grants access to many other entities. If the security of any entity having access to the data is compromised, the user's data may be accessed and maliciously changed or corrupted without the user's permission or knowledge. The more entities that are involved in handling a user's data, the less secure the data is.

SUMMARY

Briefly, aspects of the subject matter described herein relate to creating and validating cryptographically secured documents. In aspects, documents are encrypted to protect them from unauthorized access. An entity having namespace ownership rights may create a document in an authorized namespace and sign the document with a private key. Other entities may validate that the document was created by an authorized namespace owner by using a public key available in security data associated with a parent document of the document. For a root document, the public key may be available from a directory service. A namespace owner may change the namespace owner(s) that are allowed to create children of a document.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

BRIEF DESCRIPTION OF THE DRAWINGS

FIG. 4 illustrates some exemplary data structures that may be used in conjunction with aspects of the subject matter described herein;

DETAILED DESCRIPTION

Exemplary Operating Environment

Figure 1:
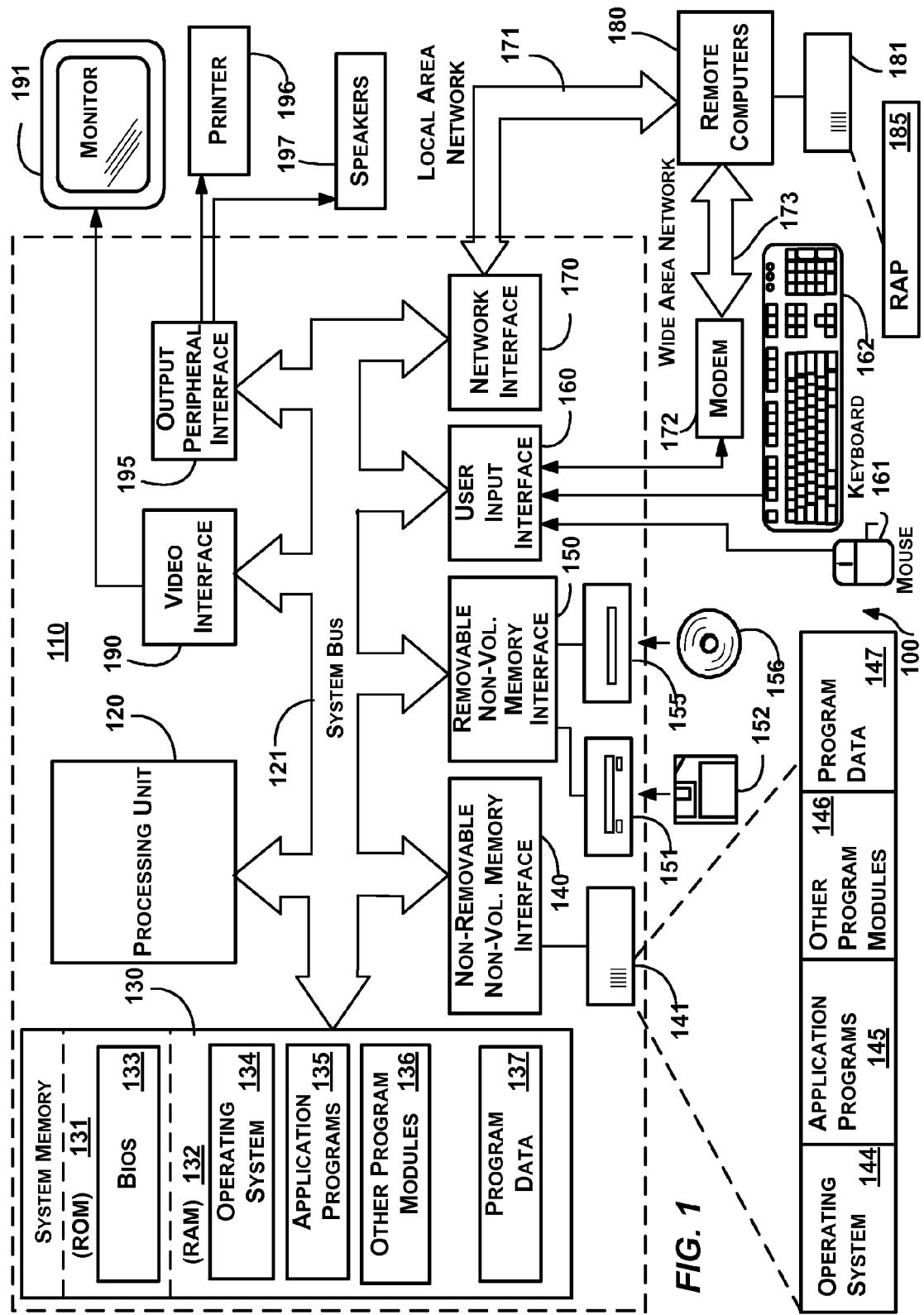
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Creating and Validating Documents

Figure 2:
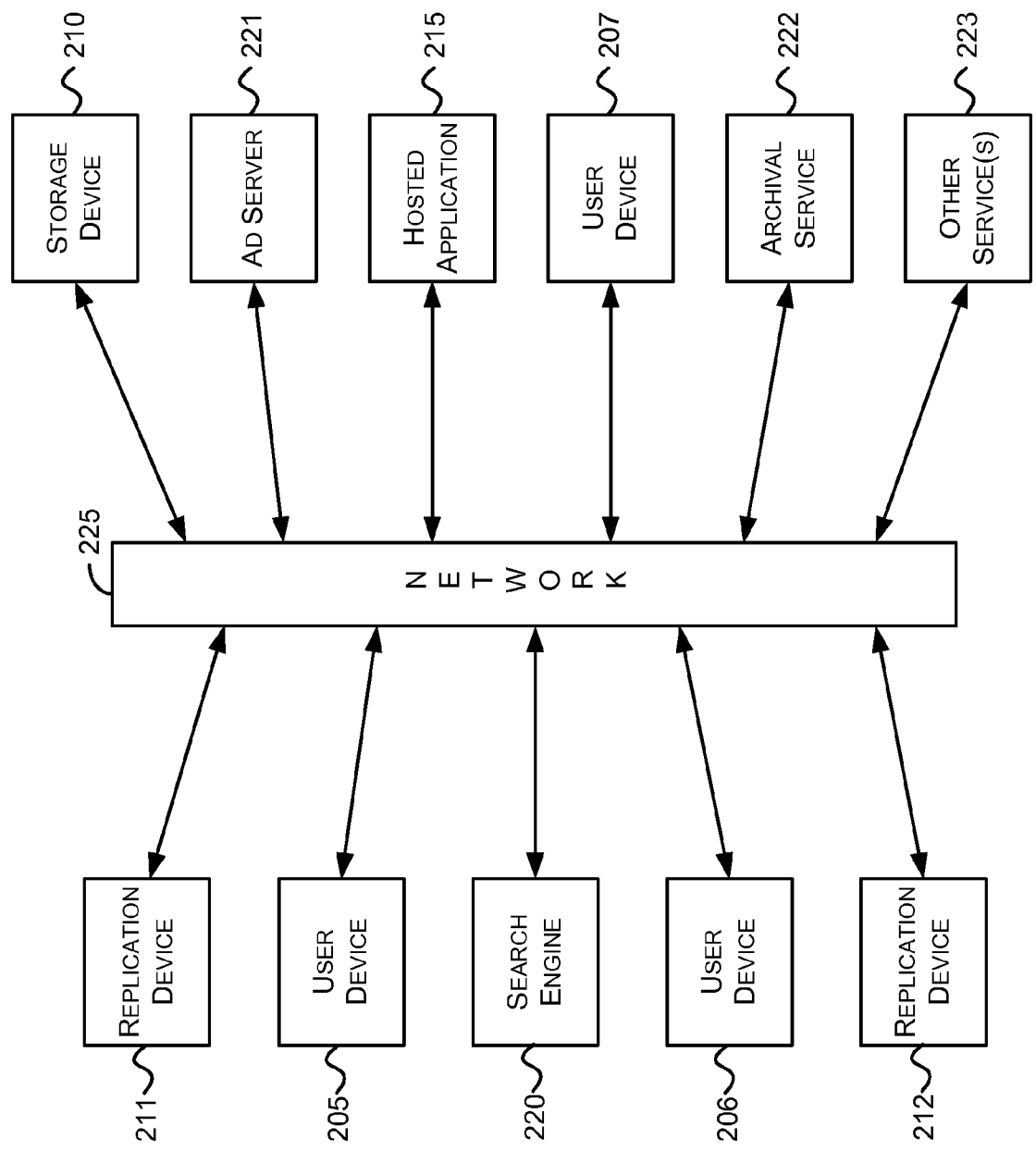
FIG. 2 is a block diagram that generally represents an exemplary environment in which aspects of the subject matter described herein may operate.

FIG. 2 is a block diagram that generally represents an exemplary environment in which aspects of the subject matter described herein may operate. The environment includes user devices 205-207, storage devices 210-212, a hosted application 215, services 220-223, and a network 225.

A user may use a user device 205 to store data on the storage device 210. The user data may then be accessed by the user devices 205-207, the services 220-223, and the hosted application 215. The user data may also be replicated on the replication devices 211-212.

The user devices 206 and 207 may be operated by the user who stored the data or may be operated by other users to whom the user has given access rights to the data. For example, a user may have a computer (e.g., user device 205) at work with which the user stores the data on the storage device 210. At home, the user may have another computer (e.g., user device 206) with which the user accesses the data. A user may also have a cell phone or other electronic device (e.g., user device 207) with which the user accesses the data. When a user is traveling, the user may access the data via a computer the user takes with him or via another computer or electronic device the user is able to use.

As mentioned previously, the user may desire to have other users have access to the data and may grant the other users such access. These users may use computers or other electronic devices (e.g., user devices 206 and 207) to access the data according to their access rights.

The user may desire to access the data via a hosted application 215. The user may access the hosted application 215 via a web browser, for example, and may then access the data via the hosted application 215.

The user may desire to have certain services have access to the user's data. For example, the user may wish to have an ad server 221 access the user's data to provide relevant ads to the user or others. The user may desire to have a search engine 220 have access to the user's data to allow others to find the user's data. The user may desire to have an archival service 222 have access to the data to create archival backups of the data. The user may also desire to have other services 223 have access to the data for various purposes.

An entity may include a physical device, process, service, machine, user, key, component, multiple of one or more of the above, and the like. The user may desire each entity with access to the user data be given a certain set of access rights that may vary from entity to entity. For example, the user may desire an archival service to be able to copy the data but not to be able to read the data in a meaningful way or to modify the data. Being able to copy the data without reading it in a meaningful way or modifying it is sometimes referred to as "copy-only" access. As another example, the user may desire to have the ad server 221 and the search engine 220 be able to read the data but not be able to write to the data. The user may desire to have some colleagues have read/write access to the data while other business associates have read access or copy-only access to the data.

The network 225 represents any mechanism and/or set of one or more devices for conveying data from one entity to another and may include intra- and inter-networks, the Internet, phone lines, cellular networks, networking equipment, direct connections between devices, wireless connections, and the like. The user may desire to have devices of the network 225 be able to copy the data to transmit it to other entities but not to be able to change the data or read it in a meaningful way.

Examples of the devices (e.g., devices 205-207 and 210-212) include cell phones, text messaging devices, smart phones, networking devices, the special and general purpose electronic devices as described in conjunction with FIG. 1, combinations, portions, or variations of the above, and the like.

As will be recognized by those of skill in the art, having many entities handling or having access to the data makes it more difficult to keep the data secure and to ensure that the data is not corrupted or updated maliciously.

Figure 3:
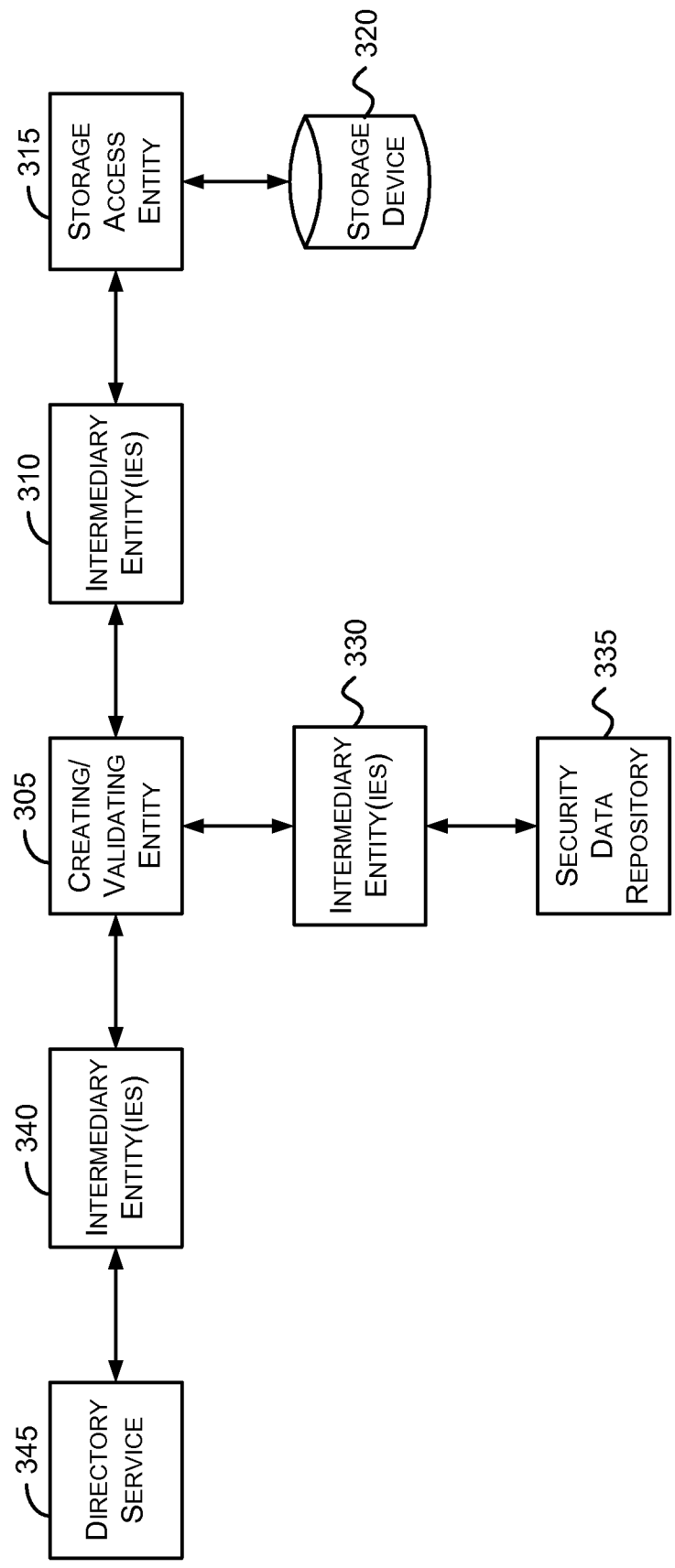
FIG. 3 is a block diagram that generally represents an exemplary set of entities that may participate in creating or validating a document according to aspects of the subject matter described herein.

FIG. 3 is a block diagram that generally represents an exemplary set of entities that may participate in creating or validating a document according to aspects of the subject matter described herein. The entities include the creating/validating entity 305, zero or more intermediary entities 310, 330, and 340, a storage access entity 315, a storage device 320, a security data repository 335, and a directory service 345.

In one embodiment, the creating/validating entity 305 is an electronic device such as a computer and the intermediary entities 310, 330, and 340 are zero or more networking devices, servers, or other devices that are between the creating/validating entity 305 and the storage access entity 315 and/or the security data repository 335 and/or the directory service 340. The storage access entity 315 is the device that is capable of accessing the storage device (e.g., the storage device 320) upon which a requested document is stored.

Document as used herein includes any set of bits of any length that are capable of being stored on a storage device. As will be discussed in further detail in conjunction with FIG. 4, a version of a document may include a document identifier, a security data identifier, and encrypted data among other data. The document identifier uniquely identifies the document in a particular namespace. The security data identifier may be used to retrieve security data pertaining to the document. The encrypted data may include, for example, content that a user wishes to secure such as a word processing file, a spreadsheet, other data, cryptographic keys that may be used to decrypt other data, or any other data important to a user.

Because the data is encrypted, it can only be meaningfully read by someone who has a key for decrypting the data. As will be discussed in further detail below, keys are kept in security data in a security data repository. With the appropriate key, a user may create a document and security data in a given namespace in a manner such that other entities are able to verify that the user was authorized to create the document and security data in the namespace.

The storage device 320 is any computer-readable medium capable of storing data and may include distributed file systems, for example. Some exemplary computer-readable media that are suitable for the storage device 320 have been described above in conjunction with FIG. 1.

The security data repository 335 stores security data pertaining to the documents stored on the storage device 320. The security data repository 335 may include one device or several devices that work in concert with each other. The security data repository 335 may include a security data record for each version of a document. The creating/validating entity 305 may request a security data record corresponding to a retrieved document by sending a security data identifier included in the document to the security data repository 335 and requesting the security data identified thereby.

In one embodiment, the security data may be stored in the document itself. In this embodiment, the creating/validating entity 305 may obtain the security data directly from the document.

The directory service 345 acts to store and provide keys used in verifying that a root document was created by an authorized entity. A root document is the lowest level document available in a namespace. Other documents may depend on the root document but it does not depend on other documents. For example, in a hierarchal namespace with directories, subdirectories, and so forth, the root document is at the root of the other documents created in the namespace. For example, if a namespace includes a path such as //domain/ path/file.txt, "domain" would be the root document. If a namespace includes an http-like syntax such as live://alice/users/file1.txt, "alice" would be the root document.

In creating a root document, a creating entity creates the document, creates a public/private key pair, signs the document with the private key, and publishes the public part of the key to the directory service. In publishing the public part of the key, the entity provides an identifier to the root document and the public key (or a portion thereof). The directory service ensures that the entity requesting to publish the public key has authority to do so. If the entity has the appropriate authority, the directory service publishes the public key (or a portion thereof) in its records.

An entity that later obtains the root document may verify that it was created by an authorized entity by requesting the public key from the directory service and verifying the signature on the document using the public key. The entity may obtain the public key by providing the identifier of the root document to the directory service. In embodiments in which the directory service stores only a portion of the public key, the validating entity may then provide this portion to another entity which uses the portion to look up and return the entire public key. Alternatively the full public key may be included in the document's security data.

One type of service that may be used as the directory service 345 is a domain name service (DNS) server or something similar. The public key may be placed in a DNS service record corresponding to the domain name (which may correspond to the root document). As the DNS servers are well established and have mechanisms for declaring ownership of a domain, this may be used without much further infrastructure in validating a root document. If the entire public key cannot be stored in the DNS service record, a mechanism described above may be used to store a portion of the public key in the DNS service record with the entire public key being available at another service.

Other specialized services may also be used as the director service 345 without departing from the spirit or scope of the aspects of the subject matter described herein. In particular, any entity that is able to verify that a user has rights to a root document and that is able to store an identifier and key (or portion thereof) pair may be used without departing from the spirit or scope of the subject matter described herein.

In one embodiment, one or more of the entities 305, 310, 315, 330, and 345 may be one or more processes or components that execute on one or more devices. In one embodiment, the storage device 320 and/or the security data repository 335 may be devices included in or attached to the device upon which the creating/validating entity 305 executes. Documents stored in the storage device 320 may be placed there by a user of the device upon which the creating/validating entity 305 executes, from another device, or may be placed there by a file replicating infrastructure, for example.

As can been seen, in an exemplary operating environment described above in conjunction with FIG. 3, a document may pass through many entities in route to and from the entities that seek to create or validate to the document. Encrypting the data of the document allows the data to be securely stored on any storage device and in any configuration of devices.

FIG. 4 illustrates some exemplary data structures that may be used in conjunction with aspects of the subject matter described herein. A document data structure (e.g., document data structure 400) may be stored for each document. Each document data structure 400 may include various fields including a document identifier 405, a security data identifier 410, a timestamp 415, encrypted data 420, and a namespace signature 425.

The document identifier 405 may be used to uniquely identify a document in a given namespace. For example, a uniform resource identifier (URI) having an http-like syntax (e.g., live://alice/users/file1.txt) may be used to identify documents in a given namespace. As another example, a globally unique identifier (GUID) may be used to identify documents in a given namespace.

The security data identifier 410 may be used to identify security data associated with the document. In one embodiment, the security data identifier 410 is a hash of one or more other fields in the security data structure 427. A hash takes input data and calculates output data whose length is fixed and does not vary based on the length of the input data. Given output data of a sufficient length and a suitable hash, the hash effectively provides a unique identifier for the input data.

The timestamp field 410 may include a timestamp that indicates when the document was created. As discussed previously, the encrypted data field 420 may include any content that the user wishes to secure.

The namespace signature field 425 comprises any one or more mechanisms that may be used to ensure that the document data structure 400 was created by an authorized user and has not changed since creation. One exemplary mechanism is a signature as described in more detail below.

The document data structure 400 may include more or fewer fields as long as it includes a mechanism for identifying or including security data pertaining to the document and a mechanism for ensuring that the document was created by an authorized user and has not changed since creation.

The security data structure 427 may include a security data identifier field 430, one or more authorization fields 440, one or more keys 450, and a signature 455. In one embodiment, the security data identifier in the security data identifier field 430 may be calculated as described previously (i.e., as a hash of the other fields of the security data structure 427).

The security data structure may also include a parent security identifier field that identifies a security data structure associated with a document that is a parent of the document (if there is one). The parent security data identifier may be used to validate whether the child document was created by a security principal authorized to create children documents as described below in more detail in conjunction with FIG. 5.

The authorization fields 440 include an authorization for each security principal (sometimes referred to as an "entity") that is to have access to or some other role with respect to the document data structure 400. In some embodiments, a security principal is an entity that can be positively identified and verified via a technique known as authentication. In other embodiments, a security principal may comprise a key decrypted from the security data associated with another document. A security principal may include a user, machine, service, process, other entity, decrypted key, or multiple (e.g., groups) of one or more of the above. Each authorization may be encrypted by a key that may be decrypted by a key held by or created by the security principal. Public key/private key cryptography is one mechanism that may be used to encrypt/decrypt an authorization.

As a particular security principal may have many keys and there may be many authorizations in a security document, in one embodiment, an optimization provides a key hint that provides the first few bits (in plain text) of a key that may be used to decrypt the authorization. The key hint allows an entity to quickly determine which authorizations it should attempt to decrypt as the entity can simply compare the first few bits with its key. When there are hundreds or thousands of authorizations, the time savings provided by this mechanism may be substantial. Because a few bits (e.g., between 2 and 16) may be provided in the key hint, the strength of the mechanism used to encrypt/decrypt the authorizations may not be significantly weakened. If needed, the strength of the mechanism may be increased by using longer keys.

In one embodiment, an authorization includes encrypted keys that allow a security principal to perform one or more access rights or roles with respect to a document. For example, a user security principal may be given the rights to read the document, create new versions of the document, create new documents within a given namespace, change which security principals may access the document, and perform any other security-related actions with respect to the document. Another user security principal may be given read-only or write-only access. Entities that are not given any rights with respect to a document may still have copy-only access (i.e., the ability to copy but not meaningfully read the encrypted data). Such entities may be used, for example, for archiving documents.

In another embodiment, the authorization may include an encrypted key that allows the security principle to decrypt additional keys elsewhere (e.g., in key(s) 450) of the security data structure 427. These additional keys may grant access rights to or other roles associated with the document to the security principal. This may be done, for example, to reduce the space needed for the security data structure 427 as a single key in an authorization may be used to decrypt multiple keys elsewhere in the security data structure 427. When a security data structure 427 includes hundreds or thousands of authorizations, many authorizations may share a common set of access rights. While the keys corresponding to these access rights may be included in the authorization itself, it may be more space efficient to provide a single key in each authorization that allows the security principals to decrypt the access keys elsewhere in the security data structure 427.

The usage options 445 may include one or more policies that relate to how documents are secured. For example, a policy may indicate that signatures be placed in just the security data structure, in just the document data structure, in both, or that some signatures are to be duplicated in both data structures while other signatures are to be placed in just one of the data structures. A policy may indicate whether each version is to be signed by an observer. Under such a policy, a version that is not signed by an observer may be determined to be invalid, for example. A policy may indicate whether a namespace owner may be changed after creation.

The keys 450 may include encrypted private keys as discussed previously that may correspond to access rights or roles granted in the document. These keys may be decrypted by keys obtained in the authorization(s) field 440 as discussed previously. In addition, the keys may include published (i.e., not encrypted) public keys that may be used for validating whether a document or security data structure was created by an authorized security principal.

The signature field 455 may be used in a similar fashion as the signature field 455 of the data structure 400.

The security data structure 427 may include more or fewer fields as long as it includes a mechanism for providing keys to access or perform a role associated with its associated document(s) to authorized users.

In one embodiment, the document data structure 400 may include an identifier that identifies another document data structure. The other document data structure may include a key that allows access to or a role associated with the document. This mechanism may be used to provide group access to or roles associated with a document. For example, the authorizations in the security data structure associated with the first document data structure may correspond to keys held by members of a group. Any member of the group who has an appropriate key may be able to obtain a member key from the security data that allows the member to access or perform a role associated with the second document according to rights granted to the group in the security data associated with the second document. Thus, accessing or providing a role associated with a document may involve accessing an intermediate document.

In another embodiment, the document data structure 400 may omit a document identifier or another document altogether. In this embodiment, another mechanism may suggest that the keys in the first document's security data may provide access to the second document. For example, if the first document was known to provide group access to another document, the member key from the first document's security data may be tried on every authorization in the security data for every other document the user attempts to access. Key hints as described previously may speed this process.

Figure 5A:
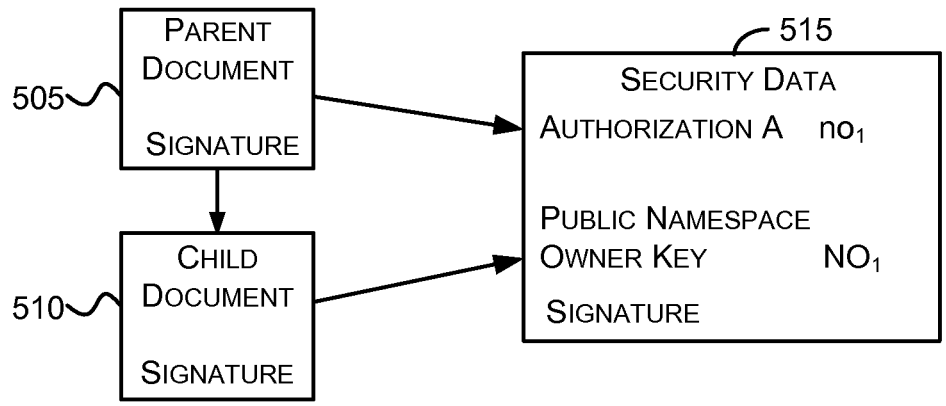
FIG. 5A is a block diagram that generally represents data that may change and actions that may occur in creating a child document in accordance with aspects of the subject matter described herein.

FIG. 5A is a block diagram that generally represents data that may change and actions that may occur in creating a child document in accordance with aspects of the subject matter described herein. The child document 510 is a child of a parent document 505. The child document 510 is created by a security principal with namespace owner rights. A security principal with namespace owner rights is sometimes referred to herein simply as a namespace owner. In creating the child document 510, a namespace owner may sign the document 510 using the private namespace owner key $no_1$ encrypted in the security data 515 identified by the document 505. The namespace owner obtains the private key $no_1$ by decrypting it in the authorization using a key the namespace owner has or may create.

In one embodiment, the namespace owner signs the document 510 using the private key $no_1$ by computing a hash of the document 510 and then encrypting the hash with the private key $no_1$. An entity that desires to validate that the document 510 was signed by the namespace owner may obtain a public namespace owner key $NO_1$ from the security data 515, decrypt the signature of the child document 510 with the public namespace owner key $NO_1$, compute the hash of the document 510, and compare the decrypted signature of the document 510 with the hash of the document 510. If the decrypted signature and the hash of the document 510 are the same, the security principal is assured that the document 510 was created by an entity having access to the private namespace owner key $no_1$.

If the namespace owner does not change the namespace owner(s) that may create new documents in the namespace of the child document, the namespace owner may associate the child document 510 with the same security data 515 with which the parent document 505 is associated. If the security principal changes the namespace owner(s) that may create new documents in the namespace of the child document, the namespace owner may create new security data 520 and associate the child document 530 with the new security data 520 as described in more detail in conjunction with FIG. 5B.

Figure 5B:
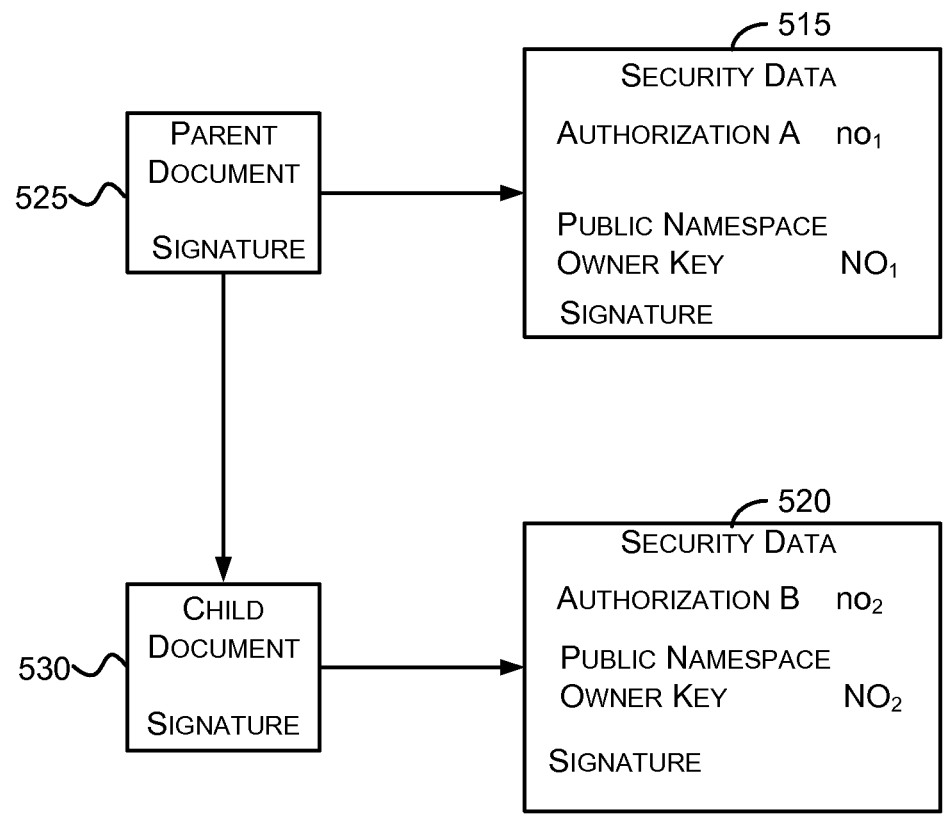
FIG. 5B is a block diagram that generally represents data that may change and actions that may occur in creating a child document and changing the namespace owner(s) that may create documents in the child document's namespace in accordance with aspects of the subject matter described herein.

FIG. 5B is a block diagram that generally represents data that may change and actions that may occur in creating a child document and changing the namespace owner(s) that may create documents in the child document's namespace in accordance with aspects of the subject matter described herein. A namespace owner of a parent document may create new security data 520. The namespace owner may also create a new private namespace owner key $no_2$ and place it in the new security data 520 to change the namespace owner(s) that are authorized to create children documents in the namespace of the child document 530.

This may be done, for example, to allow a user associated with the child document to create children documents of the child document. For example, a system administrator or the like may create a directory for a user. To allow the user to create new documents in the directory, the system administrator may indicate in the security data for the directory that the user is a namespace owner.

After creating a new private namespace owner key $no_2$ and placing it in the new security data 520, a namespace owner may sign the new security data 520 with the private namespace owner key $no_1$. This may be done to show that the namespace owner was authorized to make the namespace owner change to the security data 515 that is reflected in the security data 520. A signature may be created, for example, by using the private write key $no_1$ to encrypt a hash of the data stored in the security data 520. The namespace owner may also create a child document 530 and associate it with the new security data 520. To indicate that the namespace owner had authority to create the child document 530 in the namespace of the parent document 525, the security principal may sign the new document 530 with the private namespace owner key $no_1$.

In one embodiment, to validate that a child (e.g., child document 530) of a document (e.g., parent document 525) was created by an authorized namespace owner, a process may obtain the parent version of the document (e.g. document 525). With the parent version of the document, the process may then find the security data (e.g., security data 515) associated with the document.

In another embodiment, the new security data 520 associated with a child document 530 may include an identifier that identifies the security data 515 associated with the parent document 525. In this embodiment, there is no need to obtain the parent document 525; rather, the new security data 520 for the child document 520 may be used to locate the security data 515 for the parent document 525.

The security data 515 for the parent document 525 includes the public namespace owner key $NO_1$. With $NO_1$ and the signature in the new security data 520, the process may verify that the new security data 520 was created by a security principal having namespace owner rights. With $NO_1$ and the signature in the child document 530, the process may verify that the child document 530 was created by a security principal having namespace owner rights.

In some embodiments, the namespace owner signature may be included in the security data only, the document only, or in both the security data and the document. This may be controlled by the usage options as described previously.

An entity desiring to verify that a hierarchy of documents was created by authorized namespace owners may follow the hierarchy to the root document in a recursive manner. For example, the entity may start with the child document furthest (in a hierarchical sense) from the root document and verify that it was created by an authorized namespace owner in the manner described above with respect to FIGS. 5A and 5B. Then, the entity may take the parent document and verify that it was created by an authorized namespace owner. This may continue until the entity reaches the root document. At the root document, the entity may obtain a public key from the directory service and then determine if the root document was created by an authorized namespace owner.

To speed future verification, after determining that a hierarchy of documents was created by authorized namespace owners, the entity may update a data structure that indicates that documents were created by authorized namespace owners. To verify other documents, the entity may consult the data structure in so far as the other documents share at least a portion of the hierarchy.

Other digital signature/validation mechanisms may also be used without departing from the spirit or scope of aspects of the subject matter described herein.

Figure 6:
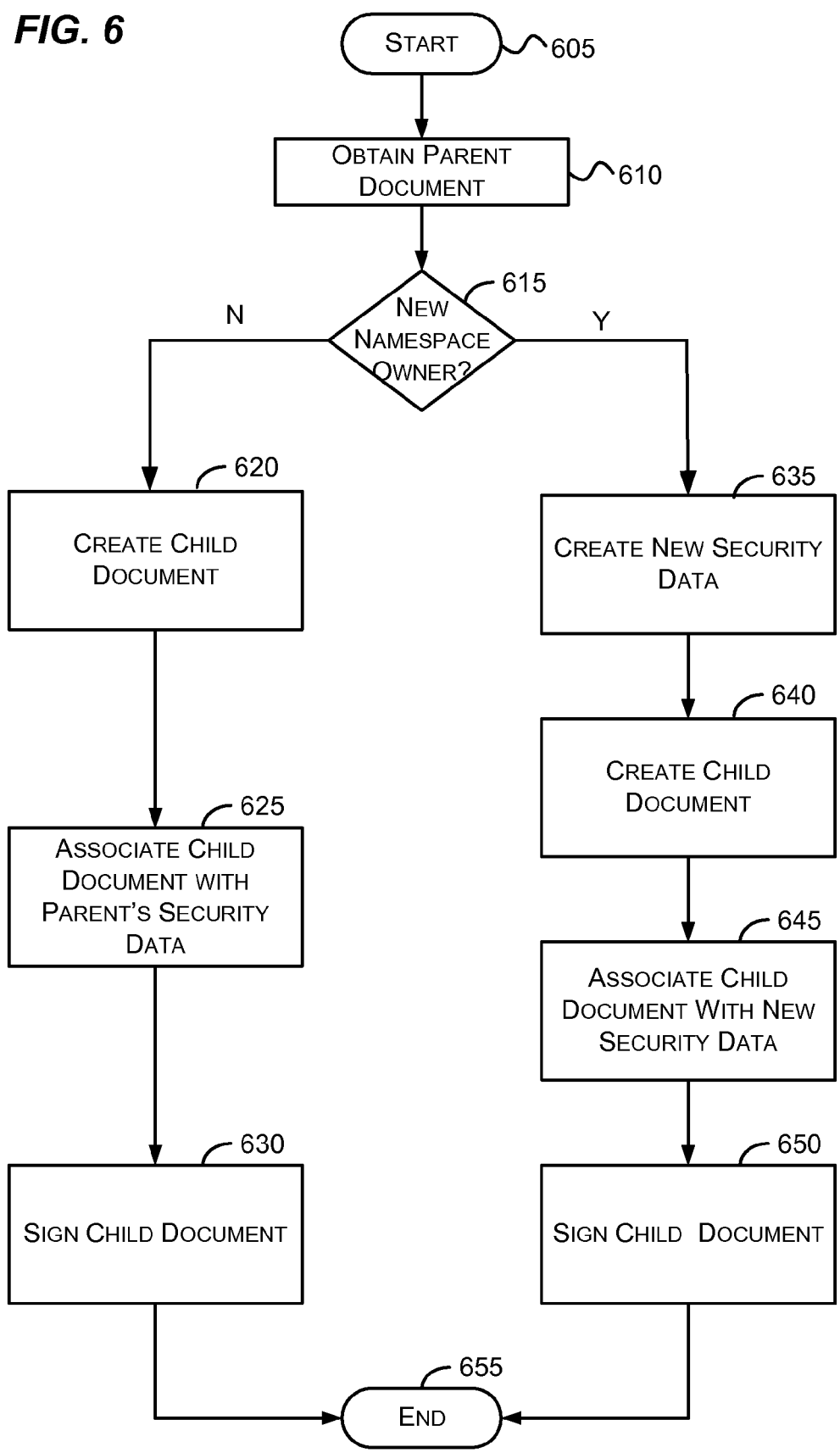
FIG. 6 is a flow diagram that generally represents exemplary actions that may occur in creating a document in accordance with aspects of the subject matter described herein.

FIG. 6 is a flow diagram that generally represents exemplary actions that may occur in creating a document in accordance with aspects of the subject matter described herein. At block 605, the actions begin.

At block 610, an entity obtains a parent of a document for which it plans to create a child document. For example, referring to FIG. 3, the creating/validating entity 305 obtains a parent document that is stored on the storage device 320. If the document being created is a root document, there is no need to obtain the parent document. Instead, a private/public key pair may be created for the namespace owner. The private key is used to sign the root document while the public key is published in a directory service.

At block 615, a determination is made as to whether the child document will include new namespace owner(s) that are different from the namespace owner(s) of the parent document. If so, the actions continue at block 635; otherwise, the actions continue at block 620. If a new namespace owner(s) is desired, new namespace owner keys may be written to the security data and access to these keys restricted to security principals that are given the namespace owner role. If the same namespace owner(s) will own the namespace of the child document, the child document may simply reference the security data for the parent document. When creating a root document, the actions continue at block 635.

At block 620, a child of the document is created. For example, referring to FIG. 3, the creating/validating entity 305 creates a child of the document.

At block 625, the child document is associated with the security data of its parent document. For example, referring to FIGS. 4 and 5A, the security data identifier 410 in the new document is filled with an identifier that identifies the security data 515.

At block 630, the child document is signed. For example, referring to FIG. 3, the creating/validating entity 305 obtains its private namespace owner key from the security data associated with the parent document and signs the new document with this private key.

At block 635, if a namespace owner(s) was created (or if a root document is being created), new security data is created. For example, referring to FIGS. 3 and 5B, the creating/validating entity 305 creates new security data 520.

At block 640, a child document is created. For example, referring to FIGS. 3 and 5B, the creating/validating entity 305 creates the child document 530.

At block 645, the child document is associated with the new security data. For example, referring to FIGS. 3, 4, and 5B, the creating/validating entity 305 fills in the security data identifier 410 of the child document 530 to identify the security data 520.

At block 650, the child document is signed in a manner similar to that described in conjunction with block 630. In addition, the new security data may also be signed.

Note, although not shown in FIG. 6 other signatures may also be obtained such as the observer signature and placed in the document and/or security data as described previously.

At block 655, the actions end.

Figure 7:
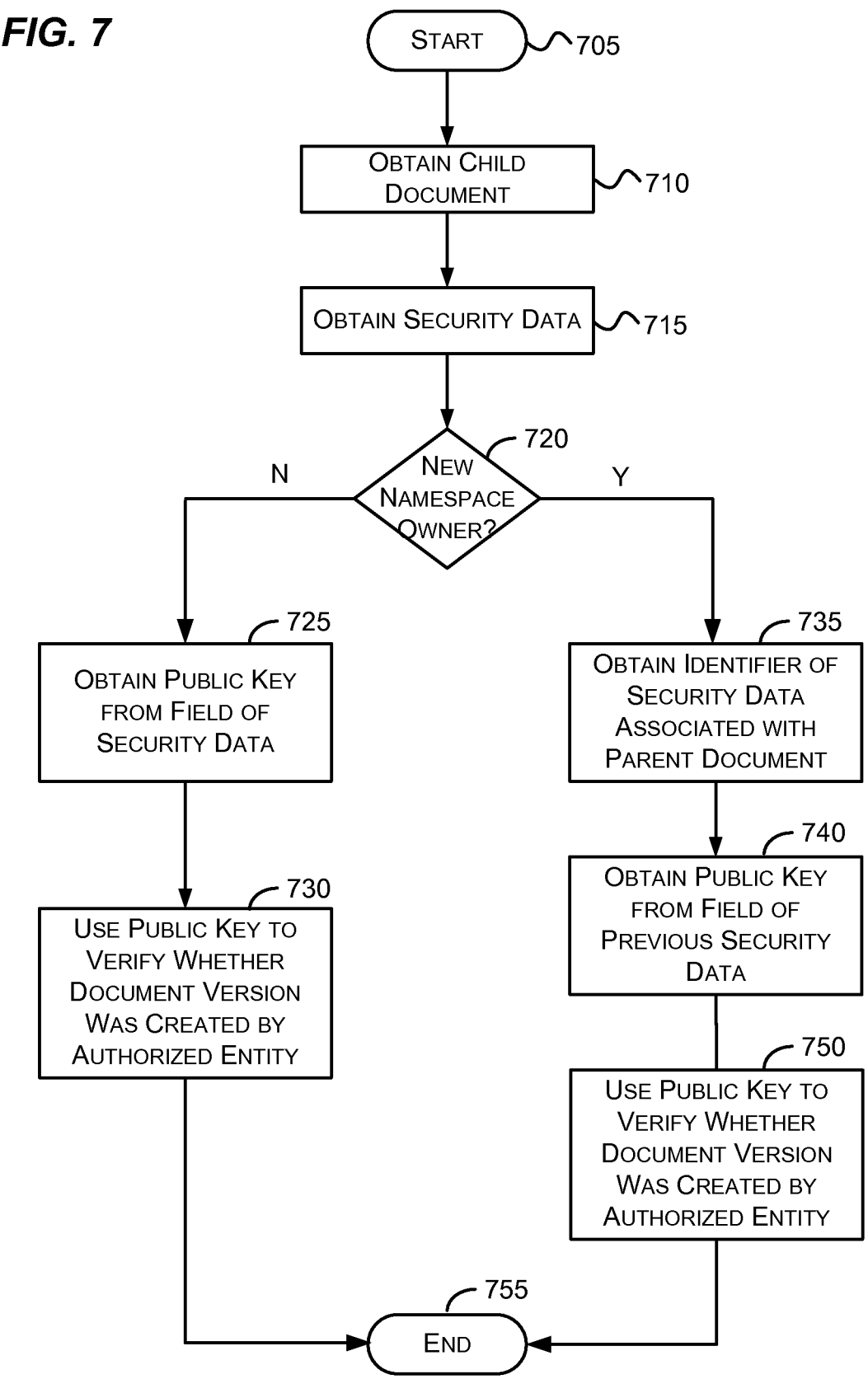
FIG. 7 is a flow diagram that generally represents exemplary actions that may occur in validating that a document was created by an authorized namespace owner in accordance with aspects of the subject matter described herein.

FIG. 7 is a flow diagram that generally represents exemplary actions that may occur in validating that a document was created by an authorized namespace owner in accordance with aspects of the subject matter described herein. At block 705, the actions begin.

At block 710, the document is obtained. For example, referring to FIG. 3, the creating/validating entity 305 may request and obtain a document which is retrieved from the storage device 320.

At block 715, the security data is obtained. If the security data is included in the document, it is retrieved from the document. If the security data is located elsewhere (such as a security data repository as shown in FIG. 3), it is obtained there.

At block 720, a determination is made as to whether a new namespace owner was set when creating the document. If so, the actions continue at block 735; otherwise, the actions continue at block 725. As described previously, a new namespace owner key may be used to change the security principals that are authorized to create document in the namespace of the children of the document.

At block 725, the public key is obtained from a field of the security data associated with the document. For example, referring to FIG. 4, a public namespace owner key may be obtained from the key(s) field 450.

At block 730, the public key is used to verify whether the document was created by an authorized namespace owner. This may be done as described previously, for example.

At block 735, when a new namespace owner key has been used to create the document, an identifier of parent document is obtained. For example, referring to FIGS. 3 and 4, the creating/validating entity 305 may obtain the parent of the document using the document identifier (if this identifier is hierarchical). The creating/validating entity 305 may then obtain a security identifier from this document for the security data record associated with the parent document.

At block 740, the public key is obtained from a field of the security data record associated with the parent document. At block 750, this public key is used to verify whether the document was created by an authorized namespace owner as described previously.

At block 755, the actions end.

Figure 8:
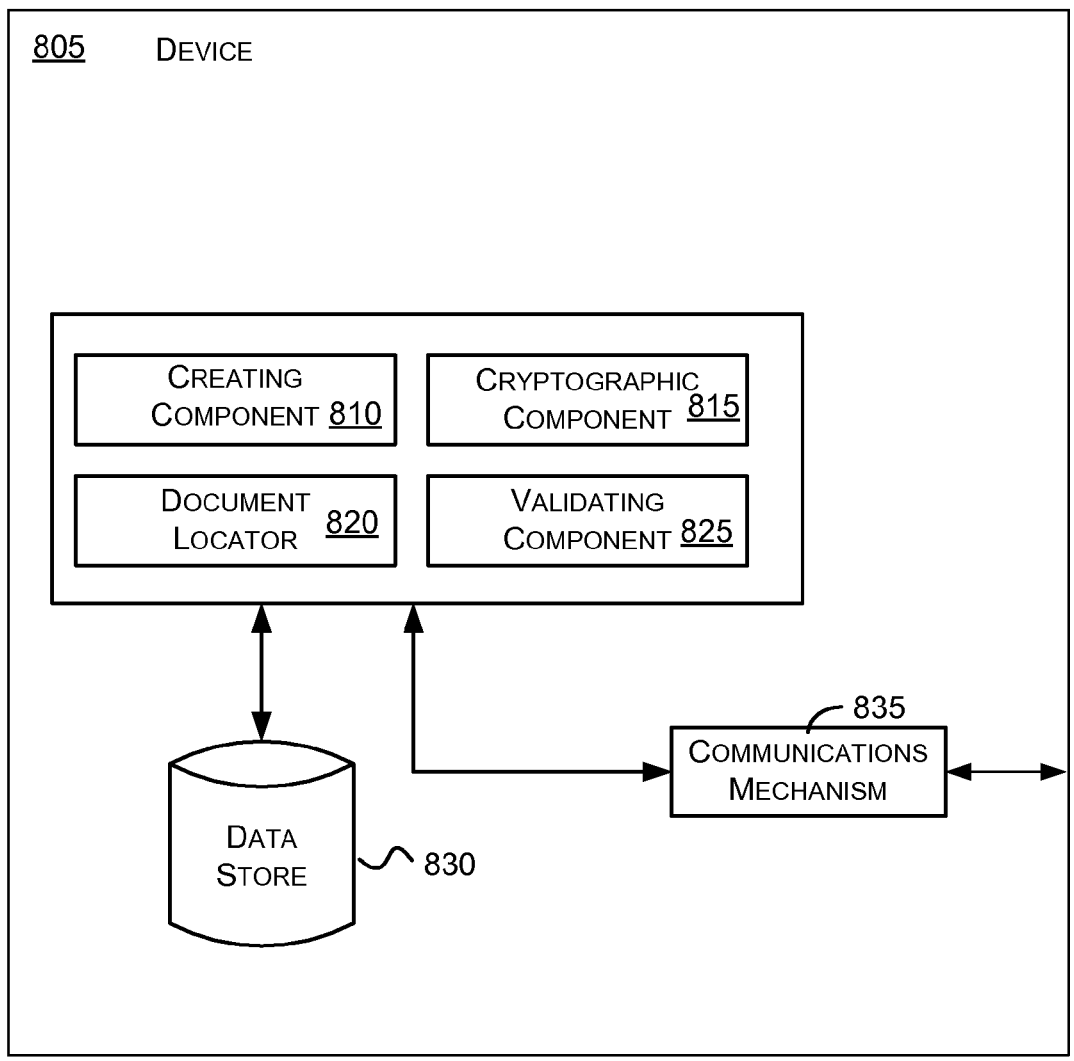
FIG. 8 is a block diagram that represents an exemplary device configured to operate in accordance with aspects of the subject matter described herein.

FIG. 8 is a block diagram that represents an exemplary device configured to operate in accordance with aspects of the subject matter described herein. The device 805 may include an creating component 810, a cryptographic component 815, a document locator 820, a validating component 825, a data store 830, and a communications mechanism 835.

The creating component 810 represents the creating entity that has namespace ownership as described previously. The cryptographic component 815 is used to encrypt and decrypt data and may comprise a library of cryptographic routines, for example.

The document locator 820 determines where the document is located which will either be on the local data store 830 or on some data store external to the device 805.

The validating component 825 represents the validating entity described previously and is involved in determining whether a document was created by an authorized namespace owner.

The communications mechanism 835 allows the device 805 to communicate with other devices to obtain documents and security data, for example. The communications mechanism 640 may be a network interface or adapter 170, modem 172, or any other means for establishing communications as described in conjunction with FIG. 1.

It will be recognized that other variations of the device 805 shown in FIG. 8 may be implemented without departing from the spirit or scope of aspects of the subject matter described herein. It will be recognized that more, fewer, or other components may exist on the device 805 without departing from the spirit or scope of aspects of the subject matter described herein.

As can be seen from the foregoing detailed description, aspects have been described related to creating a validating cryptographically secured documents. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer-readable storage device having computer-executable instructions recorded thereon, which when executed perform actions, comprising:
obtaining a key related to creating documents in a first namespace;
creating a document in the first namespace, the document identifying an encrypted field relating to an entity that is authorized to create documents in a second namespace associated with the document; and
using the key to create indicia that indicates that the document was created by an entity having access to the key.

2. The computer-readable storage device of claim 1, wherein obtaining a key related to creating documents in a first namespace comprises creating a private key.

3. The computer-readable storage device of claim 2, wherein using the key to create indicia that indicates that the document was created by an entity having access to the key comprises using the private key to create a signature of a hash of at least a portion of security data, the security data including the encrypted field.

4. The computer-readable storage device of claim 3, wherein the actions further comprise creating a public key corresponding to the private key and storing the public key in a service that provides access to the public key to entities seeking to validate that the signature was created via the private key.

5. The computer-readable storage device of claim 1, wherein obtaining a key related to creating documents in a first namespace comprises obtaining a private key from data pertaining to another document, the data authorizing a set of one or more entity to create documents in the first namespace, the data being encrypted.

6. The computer-readable storage device of claim 5, wherein the data pertaining to the other document also pertains to the document such that the data authorizes the set of one or more entities to create documents in the first and second namespaces.

7. The computer-readable storage device of claim 5, wherein a different set of one or more entities is authorized to create documents in the second namespace.

8. The computer-readable storage device of claim 5, wherein the other document is a parent of the document.

9. The computer-readable storage device of claim 1, wherein the key is encrypted and associated with an authorization field, the authorization field being decryptable by the entity.

10. The computer-readable storage device of claim 1, wherein the actions further comprise associating the document with security data of a parent document of the document if all entities authorized to create documents in the first namespace are also allowed to create documents in the second namespace.

11. A method implemented at least in part by a computer, the method comprising:
 obtaining a child document that includes a signature of an entity that created the child document, the signature being created with the use of a private key related to creating child documents in a namespace of a parent document;
 obtaining the parent document, the parent document being a parent of the child document, the parent document associated with data that includes a field that authorizes an entity to create children of the parent document in the namespace of the parent document, the field being encrypted, the data also including a public key corresponding to the private key;
 obtaining the public key; and
 determining via the public key that the signature of the entity that created the document was created with the use of the private key;
 wherein at least one of the obtaining steps or the determining step is performed by a processing unit of the computer.

12. The method of claim 11, wherein the parent document includes an identifier that identifies the data, the identifier being a hash of at least a portion of the data.

13. The method of claim 11, wherein the child document also includes an identifier that identifies other data that authorizes an entity to create children of the child document, the other data being encrypted, the other data being decryptable by the entity authorized to create children of the child document.

14. The method of claim 11, wherein the child and parent documents each include an indication of a hierarchy associated with the documents.

15. The method of claim 14, wherein the hierarchy indicates that the parent document is a parent of the child document.

16. The method of claim 11, wherein determining via the public key that the signature of the entity that created the document was created with the use of the private key comprises computing a hash of the child document, applying the public key to the signature to obtain bits, and comparing the hash of the child document to the bits.

17. The method of claim 11, wherein the field that authorizes an entity to create children of the parent document includes a key by which the private key is obtained.

18. In a computing environment, an apparatus, comprising:
 a document locator operable to determine a location of a parent document that includes encrypted data, the parent document identifying security data associated with the parent document, the security data including an encrypted field relating to an entity that is authorized to create children documents of the parent document in a namespace of the parent document;
 a cryptographic component operable to perform cryptographic operations; and
 a creating component operable to use the cryptographic component and the encrypted field to create a child document in the namespace of the parent document.

19. The apparatus of claim 18, further comprising a validating component operable to determine whether the child document was created by an authorized entity.

20. The apparatus of claim 18, wherein the encrypted field includes a private key and wherein the creating component is further operable to use the cryptographic component to sign the child document with the private key.

* * * * *